(12) United States Patent
Suga et al.

(10) Patent No.: US 10,714,787 B2
(45) Date of Patent: Jul. 14, 2020

(54) LITHIUM ION SECONDARY BATTERY

(71) Applicant: Envision AESC Japan Ltd., Zama-shi, Kanagawa (JP)

(72) Inventors: Sohei Suga, Zama (JP); Koichi Shinohara, Zama (JP); Kenji Ohara, Zama (JP); Toshihiro Horiuchi, Zama (JP); Masanori Aoyagi, Zama (JP); Junko Nishiyama, Zama (JP)

(73) Assignee: ENVISION AESC JAPAN LTD., Zama-shi (JP)

( * ) Notice: Subject to any disclaimer, the term of this patent is extended or adjusted under 35 U.S.C. 154(b) by 505 days.

(21) Appl. No.: 15/045,316

(22) Filed: Feb. 17, 2016

(65) Prior Publication Data

US 2016/0248116 A1 Aug. 25, 2016

(30) Foreign Application Priority Data

Feb. 19, 2015 (JP) ................. 2015-030716

(51) Int. Cl.
*H01M 10/0525* (2010.01)
*H01M 2/30* (2006.01)
*H01M 4/505* (2010.01)
*H01M 4/525* (2010.01)
*H01M 4/587* (2010.01)
*H01M 10/0585* (2010.01)
*H01M 4/02* (2006.01)

(52) U.S. Cl.
CPC ....... *H01M 10/0525* (2013.01); *H01M 2/305* (2013.01); *H01M 4/505* (2013.01); *H01M 4/525* (2013.01); *H01M 4/587* (2013.01); *H01M 10/0585* (2013.01); *H01M 2004/021* (2013.01); *H01M 2004/027* (2013.01); *H01M 2004/028* (2013.01); *H01M 2220/20* (2013.01)

(58) Field of Classification Search
CPC .............................................. H01M 10/00–60
USPC ......................................... 429/1–11, 47–255
See application file for complete search history.

(56) References Cited

U.S. PATENT DOCUMENTS

| | | | |
|---|---|---|---|
| 7,803,484 B2 | 9/2010 | Wu et al. | |
| 2007/0009797 A1* | 1/2007 | Takami | H01M 2/1077 429/231.1 |
| 2007/0154809 A1 | 7/2007 | Wu et al. | |
| 2008/0070119 A1* | 3/2008 | Miura | H01M 4/131 429/231.95 |
| 2011/0059359 A1 | 3/2011 | Wu et al. | |
| 2012/0028105 A1* | 2/2012 | Kumar | H01M 4/131 429/149 |
| 2014/0034872 A1* | 2/2014 | Watanabe | C01G 45/1242 252/182.1 |

(Continued)

FOREIGN PATENT DOCUMENTS

| | | |
|---|---|---|
| JP | 2007-184219 A | 7/2007 |
| JP | 2013-120734 A | 6/2013 |

(Continued)

*Primary Examiner* — Bach T Dinh
(74) *Attorney, Agent, or Firm* — Troutman Sanders LLP

(57) ABSTRACT

Provided is a lithium ion secondary battery including a power generating element that includes at least one positive electrode plate, at least one negative electrode plate, and at least one separator. A ratio B/A (mΩcm) of volume resistivity B (mΩcm$^3$) of the power generating element to an area A (cm$^2$) per one positive electrode plate is 0.4 or more and less than 0.9.

3 Claims, 1 Drawing Sheet

(56) References Cited

U.S. PATENT DOCUMENTS

2016/0093913 A1  3/2016  Saito et al.

FOREIGN PATENT DOCUMENTS

| KR | 2007-0010155 A | 1/2007 |
|----|----------------|--------|
| WO | 2014/185344 A  | 11/2014 |

* cited by examiner

LITHIUM ION SECONDARY BATTERY

CROSS-REFERENCE TO RELATED APPLICATION

This application claims priority from Japanese Patent Application No. 2015-030716 filed with the Japan Patent Office on Feb. 19, 2015, the entire content of which is hereby incorporated by reference.

BACKGROUND

1. Technical Field

The present disclosure relates to a nonaqueous electrolyte battery, particularly to a lithium ion secondary battery.

2. Related Art

Nonaqueous electrolyte batteries have been put into practical use as batteries for vehicles including hybrid vehicles and electric vehicles. It has been required to increase the output of the lithium ion secondary battery used as such an on-vehicle battery in order to improve the acceleration performance in starting the vehicle.

For increasing the output of the lithium ion secondary battery, it has been suggested that the ratio between the area and the thickness of the electrode layer including the anode (positive electrode) active material of the current collector is set within a predetermined range (JP-A-2007-184219). According to JP-A-2007-184219, the resistance of the electrode is decreased and the output of the battery is increased by setting the ratio between the area and the thickness of the electrode layer of the anode active material within a predetermined range.

SUMMARY

A lithium ion secondary battery according to an embodiment of the present disclosure includes a power generating element that includes at least one positive electrode plate, at least one negative electrode plate, and at least one separator. A ratio B/A (m$\Omega$cm) of volume resistivity B (m$\Omega$cm$^3$) of the power generating element to an area A (cm$^2$) per one positive electrode plate is 0.4 or more and less than 0.9.

DETAILED DESCRIPTION

Figure 1:
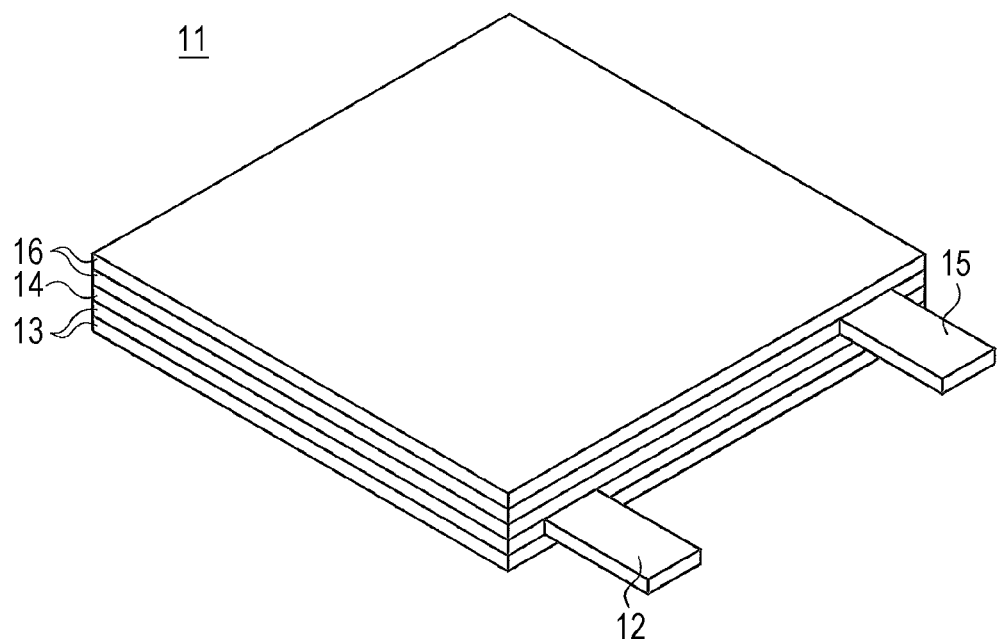
FIG. 1 is a perspective view schematically illustrating a power generating element disposed in a lithium ion secondary battery according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Decreasing the resistance of the electrode layer in order to improve the output of the battery results in the lower ion conductivity of the electrolyte solution relative to the electron conduction of the electrode layer. This produces the distribution in the electrode reaction within the electrode, so that the side reaction can proceed. In this case, the cycle lifetime of the battery may be shortened. In view of this, an object of an embodiment according to the present disclosure is to provide a lithium ion secondary battery maintaining the excellent cycle characteristics and the high output characteristics.

A lithium ion secondary battery according to an embodiment of the present disclosure includes a power generating element that includes at least one positive electrode plate, at least one negative electrode plate, and at least one separator. A ratio B/A (m$\Omega$cm) of volume resistivity B (m$\Omega$cm$^3$) of the power generating element to an area A (cm$^2$) per one positive electrode plate is 0.4 or more and less than 0.9.

The volume resistivity of the lithium ion secondary battery according to the present disclosure is set within a range appropriate for a desired electrode area of the battery. Such a lithium ion secondary battery has the high output characteristics while maintaining the cycle lifetime.

One embodiment according to the present disclosure will be described below. A positive electrode plate used in this embodiment is a battery member having a shape like a thin plate or a sheet and including a positive electrode active material layer. The positive electrode active material layer is formed by applying or rolling a mixture, which includes a positive electrode active material, a conductive auxiliary agent added as necessary, and binder, on a positive electrode current collector such as a metal foil, and then drying the mixture. A negative electrode plate is a battery member having a shape like a thin plate or a sheet and including a negative electrode active material layer. The negative electrode active material layer is formed by applying a mixture, which includes a negative electrode active material, and a conductive auxiliary agent and binder added as necessary, on a negative electrode current collector. A separator is a film-shaped battery member. The separator separates between the positive electrode plate and the negative electrode plate, thereby securing the conduction of lithium ions between the negative electrode and the positive electrode. The positive electrode plate and the negative electrode plate are overlapped on each other with the separator interposed therebetween.

When A represents the area (cm$^2$) of one positive electrode plate of the lithium ion secondary battery according to the embodiment and B represents the volume resistivity (m$\Omega$cm$^3$) of the power generating element including the positive electrode plate, the negative electrode plate, and the separator, the ratio B/A (m$\Omega$cm) is 0.4 or more and less than 0.9. The volume resistivity of the power generating element is the product of the value of the volume (cm$^3$) of the power generating element and the DC resistance (me) of the lithium ion secondary battery. The volume of the power generating element refers to the total volume of the members related to the power generation, which include the electrode materials (electrode active material, electrode current collector, conductive auxiliary agent, and binder), the separator, and the electrolyte solution. The DC resistance of the battery refers to the resistance value after the discharging is conducted for 10 seconds from the state where the residual capacity of the battery (state of charge, hereinafter referred to as "SOC") is 50%. The power generating element with the desired volume resistivity can be designed by changing as appropriate the kind, composition, mixing amount, physical properties, shape, size, or arrangement of the electrode materials of the battery (such as the electrode active material including the positive electrode active material and the negative electrode active material, the electrode current collector, the conductive auxiliary agent, and the binder), the separator, the electrolyte solution, and the leads including the positive electrode lead and the negative electrode lead.

An attempt has been made to decrease the resistance of the electrode for the purpose of improving the output of the battery. However, simply decreasing the resistance of the electrode can produce the distribution in the electrode reaction within the electrode. In general, the electron transfer speed within the electrode is higher than the lithium ion conduction speed in the electrolyte solution. Therefore, the reach of lithium ions to the electrode surface is the rate-determining factor of the electrode reaction. The electrode reaction occurs on the electrode surface and its vicinity. As the electrode resistance is decreased more and more, the electrode transfer speed in the electrode becomes higher but the ion conduction speed in the electrolyte solution does not become so high. Based on the above facts, it is supposed that decreasing the electrode resistance easily produces the electron density distribution in the thickness direction of the electrode and within the electrode surface. If the electron density distribution is produced in the electrode, the side reaction other than the intercalation and deintercalation of lithium ions (such as the decomposition of the electrolyte solution) can occur in any place in the electrode. Thus, the degree of electrode deterioration also distributes in the electrode. As a result, the battery cycle lifetime (particularly, the cycle lifetime under low temperature) can be shortened. In view of this, the present disclosures have found out that by setting the volume resistivity in accordance with the desired electrode area in the battery, the distribution of the electrode reaction in the electrode is not easily caused and accordingly the battery output can be improved while the cycle lifetime of the battery is maintained.

In this embodiment, the positive electrode active material layer including at least the positive electrode active material is disposed on the positive electrode plate. Preferably, the positive electrode plate has the positive electrode active material layer obtained by applying the mixture including the positive electrode active material, the conductive auxiliary agent, and the binder on the positive electrode current collector. In the embodiment, the density of the positive electrode active material layer is preferably in the range of 2.3 or more and 2.9 or less. By setting the density of the positive electrode active material layer within the appropriate range, the electrochemical reaction on the positive electrode can be advanced quickly. That is to say, when the density of the positive electrode active material layer is in the appropriate range, the balance between the space in the positive electrode active material layer (serving as the lithium ion path) and the conductive material included in the positive electrode active material layer (serving as the electron path) becomes appropriate. This leads to the easy progress of the electrochemical reaction on the positive electrode. By changing the positive electrode active material, the conductive auxiliary agent, or the binder included in the positive electrode active material layer or the mixing ratio among these, the density of the positive electrode active material layer can be adjusted to be in the appropriate range.

Here, the positive electrode active material is preferably a lithium nickel manganese cobalt composite oxide represented by general formula: $Li_xNi_yMn_zCo_{(1-y-z)}O_2$, where x is a numeral satisfying $0<x<1.2$ and y and z are numerals satisfying $y+z<1$. Containing more manganese makes it difficult to form the composite oxide with a single phase. For this reason, $z \leq 0.4$ is desirably satisfied. In addition, as more cobalt is contained, the cost is increased and the capacity is reduced. For this reason, $1-y-z<y$ and $1-y-z<z$ are preferably satisfied. For achieving the battery with high capacity, $y>z$ and $y>1-y-z$ are preferably satisfied. The lithium composite oxide used in this embodiment preferably has a layer crystal structure.

Examples of the conductive auxiliary agent used for the positive electrode active material layer include carbon materials including carbon fiber such as carbon nanofiber, carbon blacks such as acetylene black and Ketjen black, activated carbon, mesoporous carbon, fullerenes, and carbon nanotube. Examples of the binder used for the positive electrode active material layer include fluorine resins such as polyvinylidene fluoride, polytetrafluoroethylene, and polyvinyl fluoride, and conductive polymers such as polyanilines, polythiophenes, polyacetylenes, and polypyrroles. For the positive electrode active material layer, an additive usually used for forming the electrode, such as thickener, dispersant, or stabilizer, can be used as appropriate. The density of the positive electrode active material layer including all of these is preferably in the range of 2.3 or more and 2.9 or less.

In this embodiment, the negative electrode active material layer including at least the negative electrode active material is disposed on the negative electrode plate. Preferably, the negative electrode plate includes the negative electrode active material layer obtained by applying or rolling a mixture, which includes the negative electrode active material, the conductive auxiliary agent, and the binder, on the negative electrode current collector such as a metal foil and then drying the mixture. In this embodiment, the negative electrode active material is preferably the mixed carbon material including graphite particles and/or amorphous carbon particles, and more preferably including both the graphite particles and the amorphous carbon particles. The graphite used in this embodiment is the hexagonal crystal carbon material having the hexagonal-plate-like crystal structure. This carbon material is sometimes referred to as black lead or graphite. The shape of the graphite is preferably like a particle. The median size (D50) is preferably 8.0 µm or more and 14.0 µm or less.

The amorphous carbon used in this embodiment is the carbon material that is amorphous as a whole. This carbon material has a structure including microcrystal that is randomly networked. This microcrystal may partially have a structure similar to graphite. Examples of the amorphous carbon include carbon black, cokes, activated carbon, carbon fiber, hard carbon, soft carbon, and mesoporous carbon. The shape of the amorphous carbon used in this embodiment is preferably like a particle. The median size (D50) is particularly preferably 2.5 µm or more and 9.0 µm or less.

Examples of the conductive auxiliary agent used for the negative electrode active material layer include carbon materials including carbon fiber such as carbon nanofiber, carbon blacks such as acetylene black and Ketjen black, activated carbon, mesoporous carbon, fullerenes, and carbon nanotube. Examples of the binder used for the negative electrode active material layer include fluorine resins such as polyvinylidene fluoride, polytetrafluoroethylene, and polyvinyl fluoride, and conductive polymers such as polyanilines, polythiophenes, polyacetylenes, and polypyrroles. For the negative electrode active material layer, an additive usually used for forming the electrode, such as thickener, dispersant, or stabilizer, can be used as appropriate.

Both the graphite particles and the amorphous carbon particles expand and contract repeatedly during the battery charging and discharging cycle. The expansion of the graphite particles and the amorphous carbon particles may generate stress in the negative electrode active material layer. The generated stress can have an adverse influence on the negative electrode plate. On the other hand, it has been known that the amorphous carbon particles expand less easily than the graphite particles. In view of this, using the graphite particles and the amorphous carbon particles in combination enables to relieve the stress in the electrode layer that may be generated by the expansion of the graphite particles. The graphite particles and the amorphous carbon particles can be mixed by a usual method. For example, these particles, and if necessary the additive, are weighed at a predetermined weight ratio and the weighed particles (and additive) are mixed using mechanical mixing means typified by a ball mill or a mixer. The mixing ratio between the graphite particles and the amorphous carbon particles is preferably 95/5 to 70/30 in weight ratio. If the mixing ratio of the amorphous carbon particles is too small, the improvement of the output characteristic of the battery is not expected that much. On the other hand, if the mixing ratio of the amorphous carbon particles is too large, the battery voltage when the battery has the low SOC is decreased. In this case, the disadvantage that the battery output at low battery energy is decreased may be caused. In view of the above, the mixing ratio between the graphite particles and the amorphous carbon particles is preferably set to approximately 80/20 in weight ratio.

Examples of the separator that can be used in this embodiment include a porous film and a microporous film of polyolefins.

In this embodiment, the positive electrode lead and the negative electrode lead are connected to the power generating element in order to extract the electricity from the power generating element to the outside. These leads are led from the power generating element. A preferred example of the positive electrode lead is an aluminum plate. A preferred example of the negative electrode lead is a copper plate. In some cases, these leads may contain other metal (such as nickel, tin, or solder). In addition, the leads may be partly coated with a polymer material. The positive electrode lead and the negative electrode lead are welded to the positive electrode plate and the negative electrode plate, respectively.

In this embodiment, the preferable shape of the power generating element is rectangular. The rectangular power generating element has four sides, and one of the four sides is preferably connected to the positive electrode lead and the negative electrode lead. That is to say, the positive electrode lead and the negative electrode lead are led out from one side of the rectangle. In the power generating element of so-called one-side tab type, the distribution in the electrode reaction tends to be small within the electrode plane. This can prevent the battery cycle characteristic from deteriorating. The one side where the positive electrode lead and the negative electrode lead are connected may be either a long side or a short side of the rectangle.

The power generating element where the positive electrode lead and the negative electrode lead are connected corresponds to one unit of the battery (i.e., a battery cell). In general, a plurality of unit cells is combined to form a battery pack. When the plurality of power generating elements is combined, the positive electrode leads connected thereto are welded to each other and the negative electrode leads connected thereto are welded to each other. By having the power generating elements overlapped on each other, the battery pack is fabricated. The battery pack is inserted into the battery exterior body. Next, the inside of the exterior body is filled with the electrolyte solution. After that, the exterior body is sealed, thereby completing the lithium ion secondary battery. The lithium ion secondary battery according to this embodiment may employ a nonaqueous electrolyte solution. Examples of the nonaqueous electrolyte solution that can be used include a solution obtained by dissolving a lithium salt such as lithium hexafluorophosphate ($LiPF_6$), lithium tetrafluoroborate ($LiBF_4$), or lithium perchlorate ($LiClO_4$) in a mixed solvent including one or more kinds of organic solvents selected from cyclic carbonates such as propylene carbonate or ethylene carbonate and chained carbonates such as dimethyl carbonate, diethyl carbonate, and ethyl methyl carbonate.

A structure example of the lithium ion secondary battery according to this embodiment will be described with reference to the drawings. FIG. 1 is a schematic diagram illustrating the power generating element according to this embodiment. A power generating element 11 has a rectangular shape. The power generating element 11 mainly includes a positive electrode plate 13, a separator 14, and a negative electrode plate 16. The positive electrode plate 13, the separator 14, and the negative electrode plate 16 are stacked. The positive electrode plate 13 is connected to a positive electrode lead 12. The negative electrode plate 16 is connected to a negative electrode lead 15. The positive electrode lead 12 and the negative electrode lead 15 are connected to one side of the rectangular power generating element 11, so that the so-called one-side tab type power generating element is formed. The positive electrode lead 12 and the negative electrode lead 15 are preferably connected to one side of the rectangle as illustrated in FIG. 1. However, alternatively, the positive electrode lead 12 may be connected to one side and the negative electrode lead 15 may be connected to the other side.

Figure 2:
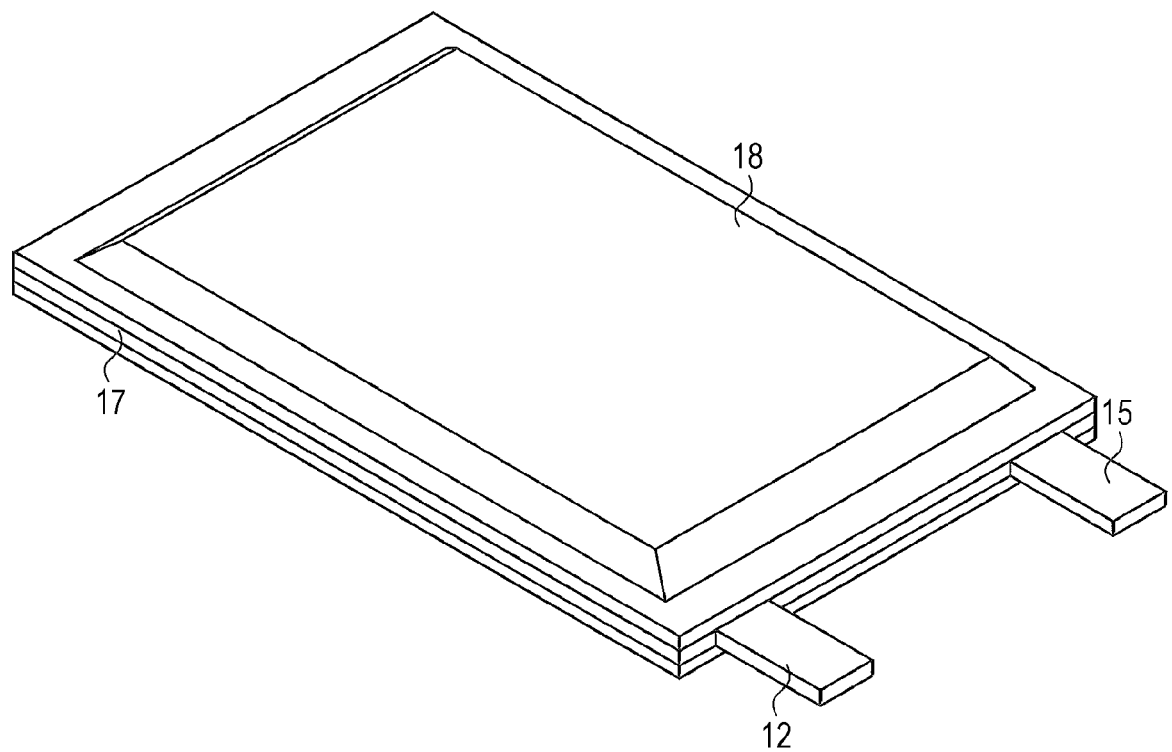
FIG. 2 is a perspective view schematically illustrating a lithium ion secondary battery according to one embodiment of the present disclosure.

FIG. 2 is a schematic diagram illustrating the lithium ion secondary battery according to this embodiment. One power generating element 17 is used. The power generating element 17 is enclosed in an exterior body 18. Here, the positive electrode lead 12 and the negative electrode lead 15 are led to the outside of the exterior body 18. Inside the exterior body 18, the electrolyte solution (not shown) is enclosed.

EXAMPLES

<Fabrication of Negative Electrode Plate>

A mixed material obtained by mixing graphite powder with a BET specific surface area of 2.0 $m^2/g$ and amorphous carbon powder (hard carbon) with a BET specific surface area of 4.5 $m^2/g$ at a weight ratio of 80:20 was used as the negative electrode active material. This mixed material, carbon black powder with a BET specific surface area of 45 $m^2/g$ as the conductive auxiliary agent, and polyvinylidene fluoride as the binder resin were added to N-methyl-2-pyrrolidone (hereinafter referred to as "NMP") at 92:2:6 in solid content mass ratio. The obtained mixture was stirred to provide slurry in which these materials were uniformly dispersed in NMP. The obtained slurry was applied onto an 8-μm-thick copper foil as the negative electrode current collector. Next, the slurry was heated at 125° C. for 10 minutes, thereby evaporating NMP. Thus, the negative electrode active material layer was formed. In addition, the negative electrode active material layer was pressed, whereby the negative electrode having the negative electrode active material layer applied on one surface of the negative electrode plate current collector was fabricated.

<Fabrication of Positive Electrode Plate>

Nickel-cobalt-lithium manganate (NCM433, i.e., nickel:cobalt:manganese=4:3:3, lithium:nickel=1:0.4, BET specific surface area 1.1 m$^2$/g) as the positive electrode active material, carbon black powder with a BET specific surface area 45 m$^2$/g as the conductive auxiliary agent, and polyvinylidene fluoride as the binder resin were added to NMP as the solvent at 88:8:4 in solid content mass ratio. To 100 parts by mass of the solid content obtained by subtracting NMP from the above mixture, 0.03 parts by mass of oxalic anhydride (molecular weight: 90) as the organic moisture scavenger was added. After that, the mixture was stirred further, so that the slurry having these materials uniformly dispersed was prepared. The obtained slurry was applied onto a 15-μm-thick aluminum foil as the positive electrode current collector. Next, the slurry was heated at 125° C. for 10 minutes, thereby evaporating NMP. Thus, the positive electrode active material layer was formed. In addition, the positive electrode active material layer was pressed, whereby the positive electrode plate having the positive electrode active material layer applied on one surface of the positive electrode current collector and having a density of 2.5 g/cm$^3$ was fabricated.

<Fabrication of Lithium Ion Secondary Battery>

Each of the negative electrode plate and the positive electrode plate fabricated as above was cut out into a rectangular shape with a predetermined size. In the portion where the coating is not applied for connection of the terminal, the positive electrode lead terminal made of aluminum was welded with ultrasonic waves. Similarly, in the portion of the negative electrode plate where the coating is not applied, the negative electrode lead terminal made of nickel with the same size as the positive electrode lead terminal was welded with ultrasonic waves. The negative electrode plate and the positive electrode plate were disposed with the separator interposed therebetween. The separator has a thickness of 25 μm and a porosity of 55% and is made of polypropylene. Thus, the electrode stack was obtained. Except one long side of the two aluminum laminated films, three sides were bonded through heat sealing, whereby a bag-shaped laminated exterior body was fabricated. Into the laminated exterior body, the electrode stack was inserted. The nonaqueous electrolyte solution was poured into the laminated exterior body and the electrode stack was impregnated with the nonaqueous electrolyte solution in vacuum. Then, the opening portion was heat-sealed under reduced pressure. Thus, the stacked lithium ion battery was obtained. The stacked lithium ion battery was subjected to high-temperature aging several times. Thus, the stacked lithium ion battery with a battery capacity of 5 Ah was obtained.

For the nonaqueous electrolyte solution used here, the nonaqueous solvent obtained by mixing propylene carbonate (hereinafter referred to as "PC"), ethylene carbonate (hereinafter referred to as "EC"), and diethyl carbonate (hereinafter referred to as "DEC") at a ratio of PC:EC:DEC=5: 25: 70 (volume ratio) was used. In this nonaqueous solvent, lithium hexafluorophosphate (LiPF$_6$) as the electrolyte salt was dissolved so that the salt concentration became 0.9 mol/L. To the obtained solution, chained disulfonate ester (methylene methane disulfonate (MMDS)) and vinylene carbonate as the additive were dissolved so that each concentration became 1 wt %. The finally obtained solution was used as the nonaqueous electrolyte solution.

<Volume Resistivity of Battery>

The volume of the battery was measured based on JIS Z 8807 "methods of measuring density and specific gravity of solid". The battery with an SOC of 50% was discharged for 10 seconds at a constant current of 10 A at 25° C. By measuring the voltage when the discharging ended, the battery resistance was obtained. From the volume of the battery and the resistance of the battery obtained in this manner, the value of the volume resistivity of the battery and the output density per unit volume of the battery were calculated.

<Output Density of Battery>

With the use of the battery with an SOC of 50%, the maximum output at which the constant output discharge at 25° C. for 10 seconds was possible was obtained. The evaluation was made assuming that the output density was the value obtained by dividing the obtained maximum output of the battery by the battery volume.

<Cycle Characteristic Test>

The stacked lithium ion battery fabricated as above was repeatedly charged and discharged at 55° C. at a current of 1 C between an SOC of 0% and an SOC of 100% for a month. Based on this, the capacity retention was calculated from the formula: (battery capacity after 1-month cycle)/(initial battery capacity). The resistance increase ratio was calculated from the formula: (resistance value after 1-month cycle)/(initial resistance value). The same cycle test was conducted at 0° C., and the capacity retention and the resistance increase ratio were calculated similarly.

<Measurement of Voltage Drop Amount of Lithium Ion Battery>

The stacked lithium ion battery fabricated as above was charged up to 4.2 V, and the voltage of the charged battery was measured by a voltage meter. Next, a needle with a thickness of φ=3 mm was penetrated into the battery at a speed of 80 mm/s. After five minutes from the needle penetration, the voltage of the battery was measured again. The value led by the formula: (battery voltage before the needle penetration)—(battery voltage after the needle penetration) (V) was used as the voltage drop amount in the evaluation.

Examples 1 to 6

By combining the negative electrode plate, the positive electrode plate, the separator, the nonaqueous electrolyte solution, and the exterior body fabricated as above, the stacked lithium ion secondary battery having a desired B/A value (ratio of the volume resistivity of the battery to the area per layer of the positive electrode plate) was fabricated. Examples 1 and 2 employ the one-side tab type stacked lithium ion secondary battery obtained by connecting the leads to one side of the rectangular negative electrode plate and positive electrode plate. In contrast, Examples 3 to 6 employ the both-side tab type stacked lithium ion secondary battery. The both-side tab type battery was fabricated by welding the positive electrode lead to one side of the rectangle and the negative electrode lead to another side thereof opposite to the one side, and leading these leads out of two aluminum laminated films when heat-sealing the aluminum laminated films. Table 1 shows the results of evaluation on the characteristics of the stacked lithium ion secondary batteries according to Examples 1 to 6.

Example 7

A positive electrode plate was fabricated in the same manner as that for the aforementioned positive electrode plate except that a mixed positive electrode active material was formed as the positive electrode active material by mixing spinel manganese with a BET specific surface area of 0.8 $m^2/g$ and the composite oxide having a BET specific surface area of 0.4 $m^2/g$ and including lithium nickelate which is partly replaced by cobalt and aluminum (nickel:cobalt:aluminum=80:15:5, lithium:nickel=1:0.8) at a weight ratio of 75/25. The both-side tab type stacked lithium ion secondary battery having the desired B/A value (ratio of the volume resistivity of the battery to the area per layer of the positive electrode plate) was fabricated in the same manner as in Examples 3 to 6 except that this positive electrode plate was used. Table 1 shows the evaluation on the characteristics of the stacked lithium ion secondary battery.

Fabrication of Electrode Plate According to Comparative Example 1

A negative electrode plate according to Comparative Example 1 was fabricated through the procedure below. As the negative electrode active material, hard carbon with a BET specific surface area of 4.5 $m^2/g$ was used. This carbon material, carbon black powder with a BET specific surface area of 65 $m^2/g$ as the conductive auxiliary agent, and polyvinylidene fluoride as the binder resin were added to NMP at 92:1:7 in solid content mass ratio. The obtained mixture was stirred, thereby providing the slurry with these materials dispersed uniformly in NMP. The obtained slurry was applied onto an 8-μm-thick copper foil as the negative electrode current collector. Next, the slurry was heated at 125° C. for 10 minutes, thereby evaporating NMP. Thus, the negative electrode active material layer was formed. In addition, the negative electrode active material layer was pressed, whereby the negative electrode having the negative electrode active material layer applied on one surface of the negative electrode current collector was fabricated.

A positive electrode plate used in Comparative Example 1 was fabricated through the procedure below. A mixed positive electrode active material used here as the positive electrode active material was obtained by mixing spinel manganese with a BET specific surface area of 0.8 $m^2/g$, and the composite oxide having a BET specific surface area of 0.4 $m^2/g$ and including lithium nickelate which is partly replaced by cobalt and aluminum (nickel:cobalt:aluminum=80:15:5, lithium:nickel=1:0.8) at a weight ratio of 75/25. This mixed positive electrode active material, carbon black powder with a BET specific surface area of 65 $m^2/g$ as the conductive auxiliary agent, and polyvinylidene fluoride as the binder resin were added at 92:5:3 in a solid content mass ratio to NMP as the solvent. To 100 parts by mass of the solid content obtained by subtracting NMP from the above mixture, 0.03 parts by mass of oxalic anhydride (molecular weight: 90) as the organic moisture scavenger was added. After that, the mixture was stirred further, so that the slurry having these materials uniformly dispersed was prepared. The obtained slurry was applied onto a 15-μm-thick aluminum foil as the positive electrode current collector. Next, the slurry was heated at 125° C. for 10 minutes, thereby evaporating NMP. Thus, the positive electrode active material layer was formed. In addition, the positive electrode active material layer was pressed, whereby the positive electrode plate having the positive electrode active material layer applied on one surface of the positive electrode current collector and having a density of 3.0 $g/cm^3$ was fabricated.

Fabrication of Electrode Plate According to Comparative Example 2

A negative electrode plate according to Comparative Example 2 was fabricated through the procedure below. As the negative electrode active material, graphite with a BET specific surface area of 0.9 $m^2/g$ was used. This carbon material, carbon black powder with a BET specific surface area of 65 $m^2/g$ as the conductive auxiliary agent, and polyvinylidene fluoride as the binder resin were added to NMP at 92:2:6 in solid content mass ratio. The obtained mixture was stirred, thereby providing the slurry with these materials dispersed uniformly in NMP. The obtained slurry was applied onto an 8-μm-thick copper foil as the negative electrode current collector. Next, the slurry was heated at 125° C. for 10 minutes, thereby evaporating NMP. Thus, the negative electrode active material layer was formed. In addition, the negative electrode active material layer was pressed, whereby the negative electrode plate having the negative electrode active material layer applied on one surface of the negative electrode current collector was fabricated.

A positive electrode plate used in Comparative Example 2 was fabricated through the procedure below. A mixed positive electrode active material used here as the positive electrode active material was obtained by mixing spinel manganese with a BET specific surface area of 0.8 $m^2/g$, and the composite oxide having a BET specific surface area of 0.4 $m^2/g$ and including lithium nickelate which is partly replaced by cobalt and aluminum (nickel:cobalt:aluminum=80:15:5, lithium:nickel=1:0.8) at a weight ratio of 75/25. This mixed positive electrode active material, carbon black powder with a BET specific surface area of 65 $m^2/g$ as the conductive auxiliary agent, and polyvinylidene fluoride as the binder resin were added at 93:3:4 in a solid content mass ratio to NMP as the solvent. To 100 parts by mass of the solid content obtained by subtracting NMP from the above mixture, 0.03 parts by mass of oxalic anhydride (molecular weight: 90) as the organic moisture scavenger was added. After that, the mixture was stirred further, so that the slurry having these materials uniformly dispersed was prepared. The obtained slurry was applied onto a 15-μm-thick aluminum foil as the positive electrode current collector. Next, the slurry was heated at 125° C. for 10 minutes, thereby evaporating NMP. Thus, the positive electrode active material layer was formed. In addition, the positive electrode active material layer was pressed, whereby the positive electrode plate having the positive electrode active material layer applied on one surface of the positive electrode current collector and having a density of 2.5 $g/cm^3$ was fabricated.

Fabrication of Electrode Plate According to Comparative Example 3

A negative electrode plate according to Comparative Example 3 was fabricated through the procedure below. As the negative electrode active material, graphite with a BET specific surface area of 0.9 $m^2/g$ was used. This carbon material, carbon black powder with a BET specific surface area of 65 $m^2/g$ as the conductive auxiliary agent, and polyvinylidene fluoride as the binder resin were added to NMP at 92:2:6 in solid content mass ratio. The obtained mixture was stirred, thereby providing the slurry with these materials dispersed uniformly in NMP. The obtained slurry was applied onto an 8-μm-thick copper foil as the negative electrode current collector. Next, the slurry was heated at 125° C. for 10 minutes, thereby evaporating NMP. Thus, the negative electrode active material layer was formed. In addition, the negative electrode active material layer was pressed, whereby the negative electrode plate having the negative electrode active material layer applied on one surface of the negative electrode current collector was fabricated.

A positive electrode plate used in Comparative Example 3 was fabricated through the procedure below. A mixed positive electrode active material used here as the positive electrode active material was obtained by mixing spinel manganese with a BET specific surface area of 0.8 m$^2$/g, and the composite oxide having a BET specific surface area of 0.4 m$^2$/g and including lithium nickelate which is partly replaced by cobalt and aluminum (nickel:cobalt:aluminum=80:15:5, lithium:nickel=1:0.8) at a weight ratio of 75/25. This mixed positive electrode active material, carbon black powder with a BET specific surface area of 65 m$^2$/g as the conductive auxiliary agent, and polyvinylidene fluoride as the binder resin were added at 93:3:4 in a solid content mass ratio to NMP as the solvent. To 100 parts by mass of the solid content obtained by subtracting NMP from the above mixture, 0.03 parts by mass of oxalic anhydride (molecular weight: 90) as the organic moisture scavenger was added. After that, the mixture was stirred further, so that the slurry having these materials uniformly dispersed was prepared. The obtained slurry was applied onto a 15-μm-thick aluminum foil as the positive electrode current collector. Next, the slurry was heated at 125° C. for 10 minutes, thereby evaporating NMP. Thus, the positive electrode active material layer was formed. In addition, the positive electrode active material layer was pressed, whereby the positive electrode plate having the positive electrode active material layer applied on one surface of the positive electrode current collector and having a density of 3.0 g/cm$^3$ was fabricated.

Fabrication of Electrode Plate According to Comparative Example 4

A negative electrode plate according to Comparative Example 4 was fabricated through the procedure below. As the negative electrode active material, graphite with a BET specific surface area of 0.9 m$^2$/g was used. This carbon material, carbon black powder with a BET specific surface area of 65 m$^2$/g as the conductive auxiliary agent, and polyvinylidene fluoride as the binder resin were added to NMP at 92:2:6 in solid content mass ratio. The obtained mixture was stirred, thereby providing the slurry with these materials dispersed uniformly in NMP. The obtained slurry was applied onto an 8-μm-thick copper foil as the negative electrode current collector. Next, the slurry was heated at 125° C. for 10 minutes, thereby evaporating NMP. Thus, the negative electrode active material layer was formed. In addition, the negative electrode active material layer was pressed, whereby the negative electrode plate having the negative electrode active material layer applied on one surface of the negative electrode current collector was fabricated.

A positive electrode plate used in Comparative Example 4 was fabricated through the procedure below. A mixed positive electrode active material used here as the positive electrode active material was obtained by mixing spinel manganese with a BET specific surface area of 0.8 m$^2$/g, and the composite oxide having a BET specific surface area of 0.4 m$^2$/g and including lithium nickelate which is partly replaced by cobalt and aluminum (nickel:cobalt:aluminum=80:15:5, lithium:nickel=1:0.8) at a weight ratio of 75/25. This mixed positive electrode active material, carbon black powder with a BET specific surface area of 65 m$^2$/g as the conductive auxiliary agent, and polyvinylidene fluoride as the binder resin were added at 93:3:4 in a solid content mass ratio to NMP as the solvent. To 100 parts by mass of the solid content obtained by subtracting NMP from the above mixture, 0.03 parts by mass of oxalic anhydride (molecular weight: 90) as the organic moisture scavenger was added. After that, the mixture was stirred further, so that the slurry having these materials uniformly dispersed was prepared. The obtained slurry was applied onto a 15-μm-thick aluminum foil as the positive electrode current collector. Next, the slurry was heated at 125° C. for 10 minutes, thereby evaporating NMP. Thus, the positive electrode active material layer was formed. In addition, the positive electrode active material layer was pressed, whereby the positive electrode plate having the positive electrode active material layer applied on one surface of the positive electrode current collector and having a density of 2.2 g/cm$^3$ was fabricated.

Fabrication of Electrode Plate According to Comparative Example 5

A negative electrode plate according to Comparative Example 5 was fabricated through the procedure below. As the negative electrode active material, the carbon material obtained by mixing graphite with a BET specific surface area of 2.0 m$^2$/g and hard carbon with a BET specific surface area of 4.5 m$^2$/g at a weight ratio of 80:20 was used. This carbon material, carbon black powder with a BET specific surface area of 45 m$^2$/g as the conductive auxiliary agent, and polyvinylidene fluoride as the binder resin were added to NMP at 92:2:6 in solid content mass ratio. The obtained mixture was stirred, thereby providing the slurry with these materials dispersed uniformly in NMP. The obtained slurry was applied onto an 8-μm-thick copper foil as the negative electrode current collector. Next, the slurry was heated at 125° C. for 10 minutes, thereby evaporating NMP. Thus, the negative electrode active material layer was formed. In addition, the negative electrode active material layer was pressed, whereby the negative electrode plate having the negative electrode active material layer applied on one surface of the negative electrode current collector was fabricated.

A positive electrode plate according to Comparative Example 5 was fabricated through the procedure below. Nickel-cobalt-lithium manganate (NCM433, i.e., nickel:cobalt:manganese=4:3:3, lithium:nickel=1:0.4, BET specific surface area 1.1 m$^2$/g) as the positive electrode active material, carbon black powder with a BET specific surface area 45 m$^2$/g as the conductive auxiliary agent, and polyvinylidene fluoride as the binder resin were added to NMP as the solvent at 88:8:4 in solid content mass ratio. To 100 parts by mass of the solid content obtained by subtracting NMP from the above mixture, 0.03 parts by mass of oxalic anhydride (molecular weight: 90) as the organic moisture scavenger was added. After that, the mixture was stirred further, so that the slurry having these materials uniformly dispersed was prepared. The obtained slurry was applied onto a 15-μm-thick aluminum foil as the positive electrode current collector. Next, the slurry was heated at 125° C. for 10 minutes, thereby evaporating NMP. Thus, the positive electrode active material layer was formed. In addition, the positive electrode active material layer was pressed, whereby the positive electrode plate having the positive electrode active material layer applied on one surface of the positive electrode current collector and having a density of 2.5 g/cm$^3$ was fabricated.

Fabrication of Lithium Ion Secondary Batteries According to Comparative Examples 1 to 5

A both-side tab type stacked lithium ion battery having the B/A value in Table 1 (ratio of the volume resistivity of the battery to the area per layer of the positive electrode plate) was fabricated in the same manner as in Examples 3 to 6 except that the negative electrode plate and positive electrode plate according to Comparative Example 1 were used. Moreover, a one-side tab type stacked lithium ion battery having the B/A value in Table 1 (ratio of the volume resistivity of the battery to the area per layer of the positive electrode plate) was fabricated in the same manner as in Examples 1 and 2 except that the negative electrode plate and positive electrode plate according to Comparative Examples 2 to 5 were used. Table 1 shows the results of evaluation on the characteristics of the stacked lithium ion batteries according to Comparative Examples 1 to 5.

A per one positive electrode plate is too small. It is important to set the ratio B/A (mΩcm) in the predetermined range in order to secure the safety of the battery.

Examples of the embodiment according to the present disclosure have been described so far. However, the above description merely represents some examples of the embodiment of the present disclosure, and does not limit the technical range of the embodiment of the present disclosure to the particular embodiment or to the specific structure. The lithium ion secondary battery according to the embodiment of the present disclosure may be any of the following first to fifth lithium ion secondary batteries.

The first lithium ion secondary battery is a lithium ion secondary battery including a power generating element in which at least one positive electrode plate, at least one negative electrode plate, and at least one separator are stacked, wherein a ratio B/A (mΩcm) of volume resistivity B (mΩcm$^3$) of the power generating element to an area A (cm$^2$) per one positive electrode plate is 0.4 or more and less than 0.9.

The second lithium ion secondary battery is the first lithium ion secondary battery, wherein: a positive electrode

TABLE 1

Evaluation on battery characteristics

| | Positive electrode density (g/cm$^3$) | Cell thickness (mm) | Cell area resistivity (mΩcm$^2$) | B/A (mΩcm) | Output density (W/L) | Electrode lead | Cycle characteristic retention at 55° C. (%) | Cycle characteristic retention at 0° C. (%) | Voltage drop amount (V) |
|---|---|---|---|---|---|---|---|---|---|
| Example 1 | 2.5 | 1.4 | 20.8 | 0.492 | 6800 | One-side tab | 83 | 98 | 0.1 |
| Example 2 | 2.5 | 1.8 | 20.8 | 0.488 | 6800 | One-side tab | 83 | 98 | 0.1 |
| Example 3 | 2.5 | 2.5 | 19.3 | 0.784 | 7400 | Both-side tab | 81 | 97 | 0.1 |
| Example 4 | 2.5 | 2.9 | 15.3 | 0.720 | 8100 | Both-side tab | 80 | 97 | 0.1 |
| Example 5 | 2.5 | 3.1 | 19.3 | 0.776 | 7500 | Both-side tab | 82 | 98 | 0.1 |
| Example 6 | 2.5 | 3.6 | 15.3 | 0.714 | 8100 | Both-side tab | 80 | 98 | 0.1 |
| Example 7 | 2.5 | 3.2 | 15.6 | 0.800 | 7300 | Both-side tab | 79 | 96 | 0.1 |
| Comparative Example 1 | 3.0 | 3.0 | 26.2 | 1.260 | 4600 | Both-side tab | 73 | 92 | 0.1 |
| Comparative Example 2 | 2.5 | 6.9 | 19.9 | 0.960 | 3500 | One-side tab | 73 | 89 | 0.1 |
| Comparative Example 3 | 3.0 | 6.9 | 19.9 | 0.960 | 3500 | One-side tab | 70 | 88 | 0.1 |
| Comparative Example 4 | 2.2 | 6.9 | 19.9 | 0.960 | 3500 | One-side tab | 70 | 88 | 0.1 |
| Comparative Example 5 | 2.5 | 1.8 | 15.8 | 0.372 | 8900 | One-side tab | 83 | 98 | 4.0 |

The lithium ion secondary battery has the excellent cycle characteristics when the ratio B/A (mΩcm) of the volume resistivity B of the lithium ion secondary battery to the area A per one positive electrode plate is in a predetermined range. The place at which the electrode lead is disposed has an influence on the output density. In consideration of the balance with the cycle characteristic, however, the one-side tab type is more preferable. The positive electrode active material has an influence on the cycle characteristic (especially, the 55° C.-cycle characteristic). As a conclusion, it is preferable to use the NCM-based positive electrode active material in order to maintain the cycle characteristic. Note that the voltage drop amount in the occurrence of short-circuiting is large if the ratio B/A (mΩcm) of the volume resistivity B of the lithium ion secondary battery to the area active material layer including a positive electrode active material is disposed on the positive electrode plate; and the positive electrode active material layer has a density of 2.3 or more and 2.9 or less.

The third lithium ion secondary battery is the first or second lithium ion secondary battery, wherein: the positive electrode active material is a lithium nickel manganese cobalt composite oxide having a layer crystal structure represented by a general formula: $Li_xNi_yMn_zCo_{(1-y-z)}O_2$.

The fourth lithium ion secondary battery is any of the first to third lithium ion secondary batteries, wherein: a negative electrode active material layer including a negative electrode active material is disposed on the negative electrode plate; and the negative electrode active material includes graphite particles and amorphous carbon particles.

The fifth lithium ion secondary battery is any of the first to fourth lithium ion secondary batteries, wherein the power generating element has a rectangular shape; one side of the rectangular shape is connected to a positive electrode lead and a negative electrode lead; and the positive electrode lead and the negative electrode lead are led out of the power generating element.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising a power generating element, the power generating element including:
    at least one positive electrode plate having a shape like a sheet, said positive electrode plate having an area A (cm$^2$);
    at least one negative electrode plate; and
    at least one separator, wherein
    a ratio B/A (mΩ cm) of volume resistivity B (mΩ cm$^3$) of the power generating element to the area A (cm$^2$) per one positive electrode plate is 0.488 or more and less than 0.9,
    wherein a positive electrode active material layer including a positive electrode active material is disposed on the positive electrode plate,
    wherein the positive electrode active material layer has a density of 2.3 or more and 2.9 or less,
    wherein the positive electrode active material is a lithium nickel manganese cobalt composite oxide represented by a general formula: $Li_xNi_yMn_zCo_{(1-y-z)}O_2$, where x is a numeral satisfying 0<x<1.2 and y and z are numerals satisfying y+z<1, and
    wherein the lithium nickel manganese cobalt composite oxide has a layer crystal structure.

2. The lithium ion secondary battery according to claim 1, wherein
    a negative electrode active material layer including a negative electrode active material is disposed on the negative electrode plate, and
    the negative electrode active material contains graphite particles and amorphous carbon particles.

3. The lithium ion secondary battery according to claim 1, wherein
    the power generating element has a rectangular shape,
    one side of the rectangular shape is connected to a positive electrode lead and a negative electrode lead, and
    the positive electrode lead and the negative electrode lead are led out of the power generating element.

* * * * *